(12) United States Patent
McLeod et al.

(10) Patent No.: US 7,262,962 B1
(45) Date of Patent: Aug. 28, 2007

(54) TECHNIQUES FOR COOLING MULTIPLE SETS OF CIRCUIT BOARDS CONNECTED BY A MIDPLANE

(75) Inventors: Gary McLeod, Flagstaff, AZ (US); Dina Birrell, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/217,769

(22) Filed: Sep. 1, 2005

(51) Int. Cl.
*G06F 1/20* (2006.01)
(52) U.S. Cl. ............... 361/687; 361/688; 700/299
(58) Field of Classification Search ........ 361/679–687, 361/724–727, 688; 700/299, 300; 379/325; 211/26
See application file for complete search history.

(56) References Cited

U.S. PATENT DOCUMENTS

| | | | |
|---|---|---|---|
| 5,343,362 A | 8/1994 | Solberg | 361/710 |
| 6,135,875 A | 10/2000 | French | 454/184 |
| 6,186,890 B1 | 2/2001 | French et al. | 454/184 |
| 6,430,052 B1 | 8/2002 | Kordes et al. | 361/719 |
| 6,480,380 B1 | 11/2002 | French et al. | 361/690 |
| 6,481,527 B1 | 11/2002 | French et al. | 181/201 |
| 6,529,374 B2 | 3/2003 | Yamashita et al. | 361/687 |
| 6,552,918 B1 | 4/2003 | Amin | 363/40 |
| 6,711,019 B2 | 3/2004 | Manabe et al. | 361/704 |
| 6,714,416 B1 | 3/2004 | McLeod et al. | 361/719 |
| 6,728,104 B1 | 4/2004 | Ahmad et al. | 361/704 |
| 6,826,456 B1 * | 11/2004 | Irving et al. | 700/299 |
| 6,987,673 B1 | 1/2006 | French et al. | 361/727 |
| 2003/0058618 A1 * | 3/2003 | Soetemans et al. | 361/688 |
| 2006/0061955 A1 * | 3/2006 | Imblum | 361/685 |

\* cited by examiner

*Primary Examiner*—Hung Van Duong
(74) *Attorney, Agent, or Firm*—BainwoodHuang

(57) ABSTRACT

An electronic equipment assembly includes a shelf having a front section configured to support a front set of circuit boards and a rear section configured to support a rear set of circuit boards. The electronic equipment assembly further includes a midplane disposed within the shelf between the front section and the rear section. The midplane is configured to directly connect to the front set of circuit boards and to the rear set of circuit boards. The electronic equipment assembly further includes a fan subsystem disposed within the shelf. The fan subsystem is configured to generate an air stream through the front and rear sections with air flow of the air stream being faster through the front section past the front set of circuit boards relative to the rear section past the rear set of circuit boards.

17 Claims, 4 Drawing Sheets

US 7,262,962 B1

TECHNIQUES FOR COOLING MULTIPLE SETS OF CIRCUIT BOARDS CONNECTED BY A MIDPLANE

BACKGROUND

Some network equipment is designed for installation within a standard electronic equipment rack (e.g., a conventional 19-inch rack). Such equipment typically includes a housing which mounts to the equipment rack, a set of circuit boards disposed within the housing, and a fan assembly which is disposed within the housing. During operation, the fan assembly moves ambient air at the front of the equipment rack past the set of circuit boards and out the back of the equipment rack. As the ambient air flows across the set of circuit boards, the air removes heat from the circuit boards thus enabling the electronic circuitry on the circuit boards to operate within a controlled temperature range while performing a variety of network operations (e.g., routing operations, switching operations, etc.).

One conventional network equipment design (hereinafter referred to as the "horizontal design") includes a housing having an air inlet at the front of equipment rack and air outlet at the back of the equipment rack. The air inlet and the air outlet are at substantially the same height, and a fan assembly within the housing moves air from the air inlet to the air outlet through the housing and past the set of circuit boards in a substantially horizontal manner for robust heat dissipation.

Another conventional network equipment design (hereinafter referred to as the "up/across/up design") includes a housing having an air inlet at the front of equipment rack and air outlet at the back of the equipment rack with the air outlet at a substantially higher height than the air inlet. The circuit boards are horizontally-oriented, i.e., the circuit boards reside parallel to each other and substantially parallel to the floor. During operation, the fan assembly moves air from the air inlet in an upward direction within the housing. The air further moves horizontally across the horizontally-oriented circuit boards and then again in the upward direction and out of the housing through the air outlet.

SUMMARY

Unfortunately, there are deficiencies to the above-described conventional network equipment designs. For example, as manufacturers of network equipment attempt to achieve higher circuit densities, such manufacturers often utilize midplanes or backplanes to connect multiple circuit boards together. Such manufacturers may prefer to orient the midplanes or backplanes such that one side of the midplane (or backplane) faces the front of the equipment rack and an opposite side of the midplane faces the back of the equipment rack to enable a user to easily install or remove circuit boards through the front and/or back of the equipment rack.

Unfortunately, a midplane having one side which faces the front of the equipment rack and another side which faces the back would obstruct the airflow through these conventional network equipment designs. That is, the midplane would operate to block lateral air flow from the front of the equipment rack to the back of the equipment rack.

Although one solution would be to vent the airflow out a top, bottom or side of the equipment rack rather than out the back of the rack, the top, bottom or side of the rack may not always be available. Rather, other equipment may reside at the top, bottom and/or sides of the equipment rack thus requiring the air to exit out the back of the rack.

In contrast to the above-described conventional equipment racks, an improved electronic equipment assembly utilizes a serpentine airflow pathway in which air of an air stream passes through a front chassis section and a rear chassis section by going around a midplane disposed between the front and rear chassis sections. Furthermore, as the air stream flows through the front and rear chassis sections, the air stream is capable of being purposefully controlled to flow through the sections at different rates (e.g., by giving each section a different cross-sectional area). With the air stream flowing at different rates, temperature-critical circuitry can be disposed in the section having the faster airflow for robust heat removal. As such, there is less dependency on particular locations of air input and output ducts thus enabling manufacturers to place these ducts at convenient and desirable locations, e.g., at the same height at the front and rear of an equipment rack.

One embodiment is directed to an electronic equipment assembly which includes a chassis having a front section configured to support a front set of circuit boards and a rear section configured to support a rear set of circuit boards. The electronic equipment assembly further includes a midplane disposed within the chassis between the front section and the rear section. The midplane is configured to directly connect to the front set of circuit boards and to the rear set of circuit boards. The electronic equipment assembly further includes a fan subsystem disposed within the chassis. The fan subsystem is configured to generate an air stream through the front and rear sections with air flow of the air stream being faster through the front section past the front set of circuit boards relative to the rear section past the rear set of circuit boards.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved electronic equipment assembly utilizes a serpentine airflow pathway in which air of an air stream passes through a front card cage (or chassis section) and a rear card cage (or chassis section) by going around a midplane disposed between the front and rear card cages. Furthermore, as the air stream flows through the front and rear card cages, the air stream is capable of being purposefully controlled to flow through the card cages at different rates (e.g., by giving each card cage or chassis section a different cross-sectional area). With the air stream flowing at different rates, temperature-critical circuitry can be disposed in the section having the faster airflow for enhanced temperature control. As such, there is less dependency on particular locations of air input and output ducts thus enabling manufacturers to place these ducts at convenient and desirable locations, e.g., at the same height at the front and rear of an equipment rack.

Figure 1:
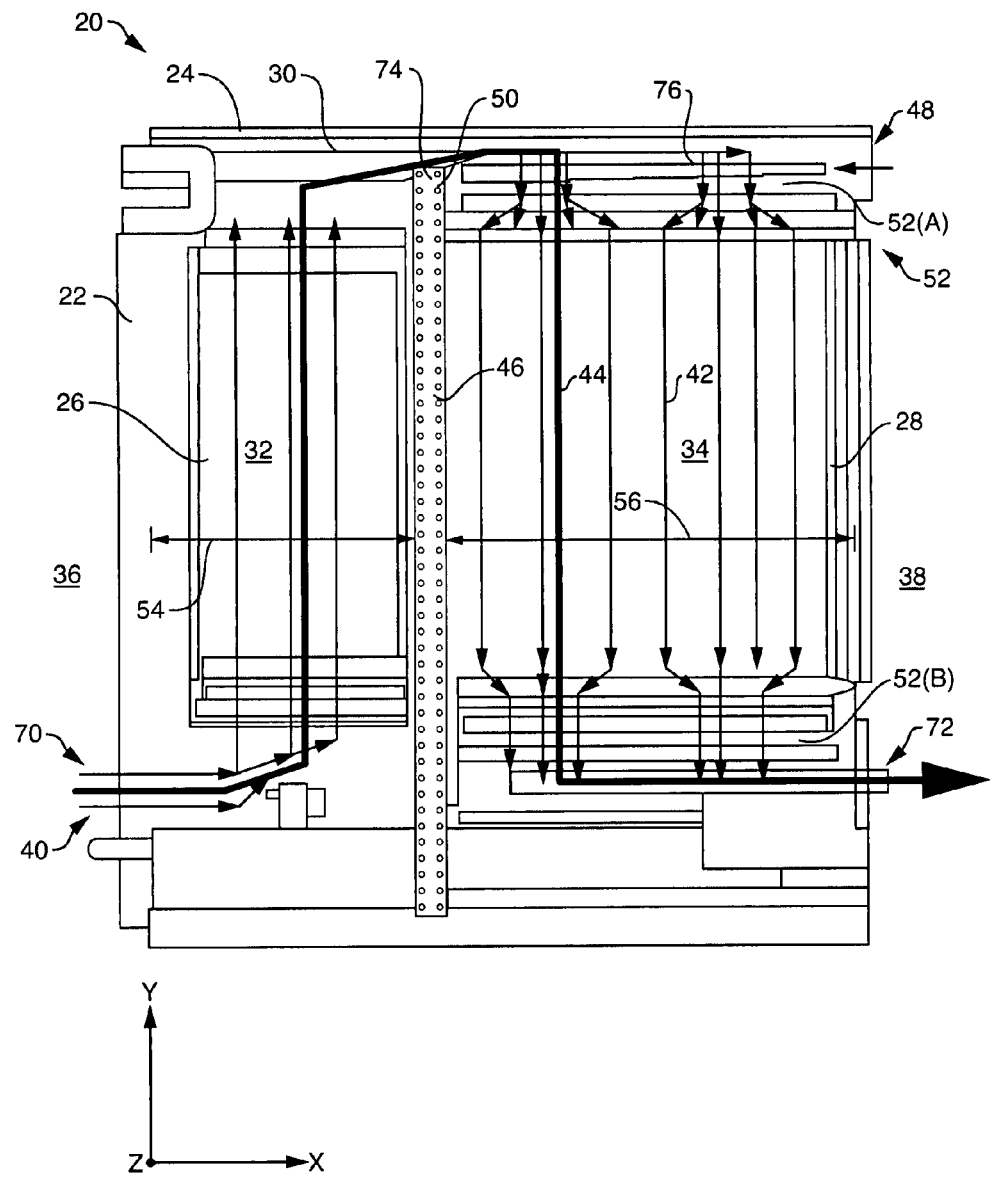
FIG. 1 is a cross-sectional side view of an electronic system having an improved electronic equipment assembly which utilizes a serpentine airflow pathway.
Figure 2:
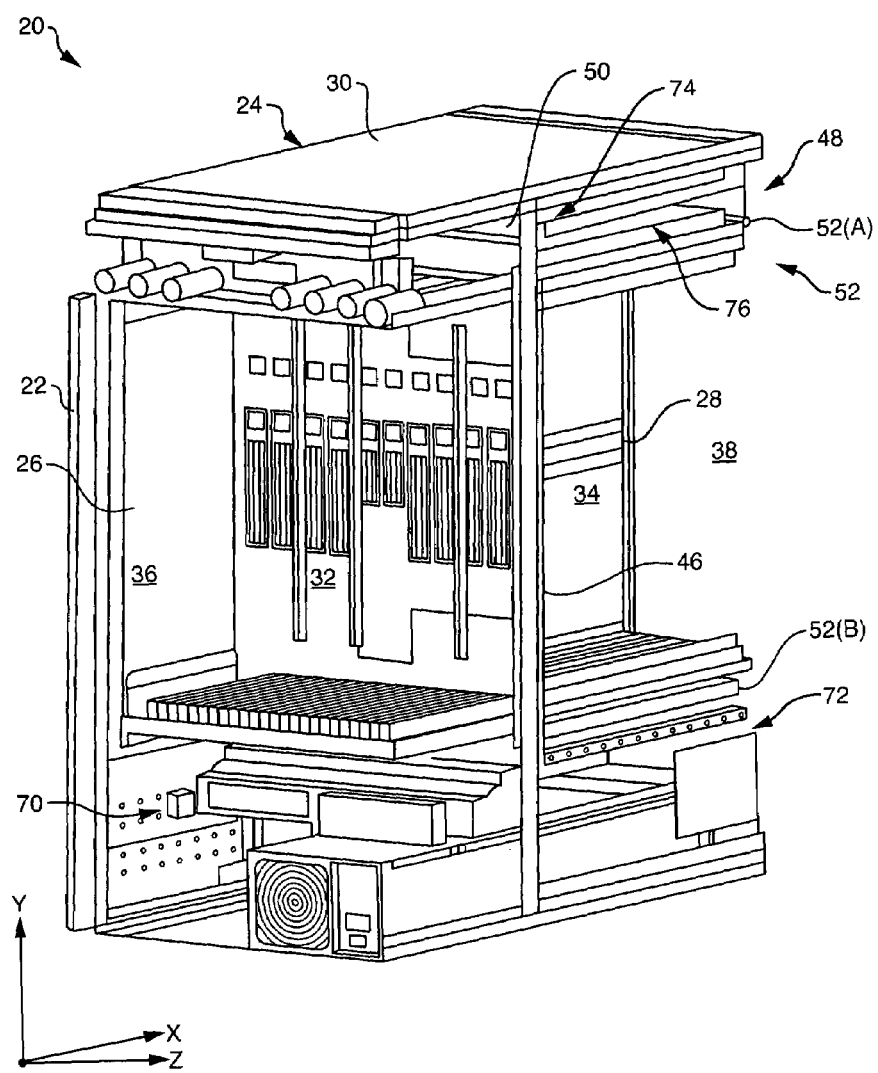
FIG. 2 is a perspective view from a front of the electronic system of FIG. 1.
Figure 3:
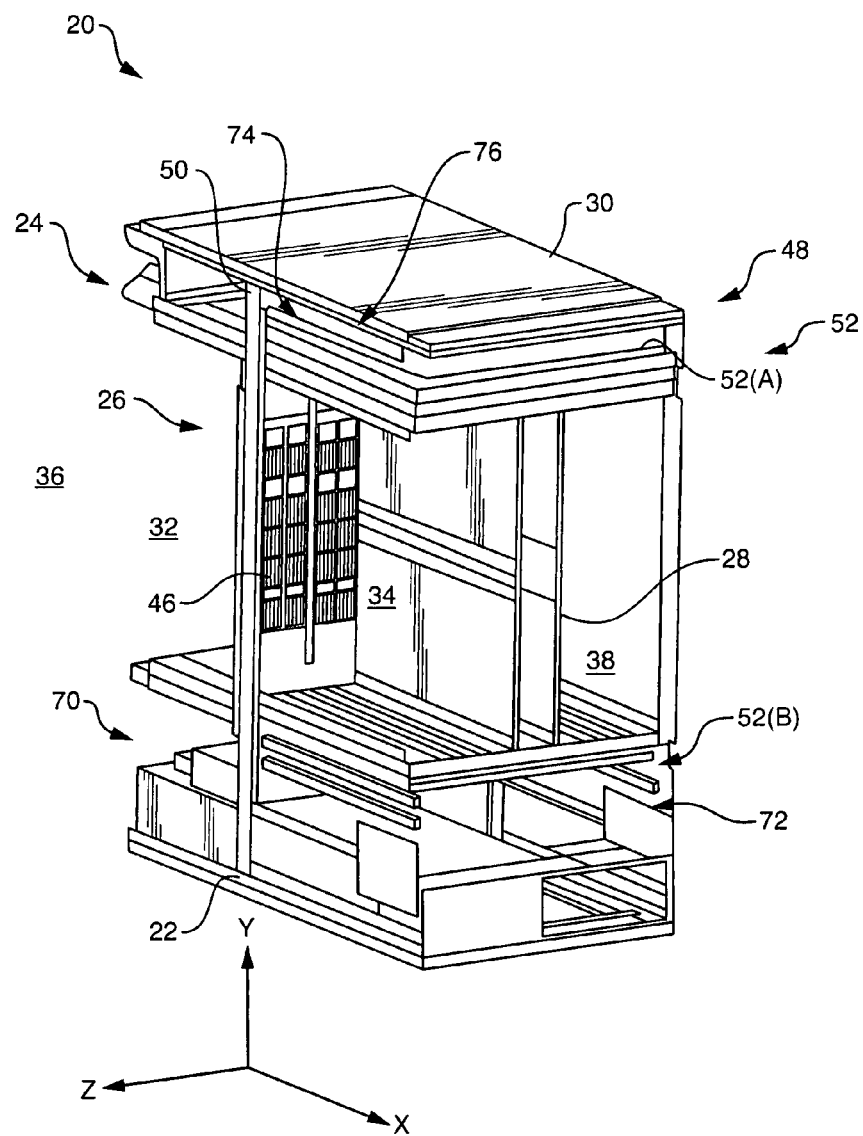
FIG. 3 is a perspective view from a rear of the electronic system of FIG. 1.

FIGS. 1-3 show an electronic system 20 having an electronic equipment shelf 22 (e.g., a standard 19-inch rack, cabinet, etc.), an improved electronic equipment assembly 24, a front set of circuit boards 26, and a rear set of circuit boards 28. FIG. 1 is a cross-sectional side view of the electronic system 20. FIG. 2 is a cut-away side view from an angle at the front of the electronic system 20. FIG. 3 is a cut-away side view from an angle at the back of the electronic system 20.

The electronic equipment assembly 24 includes a chassis 30 having a front section 32 and a rear section 34. The chassis 30 mounts to the electronic equipment shelf 22 so that the front section 32 is adjacent a front 36 of the electronic equipment shelf 22 and the rear section 34 is adjacent a rear 38 of the electronic equipment shelf 22. The front section 32 of the shelf 22 is configured to support the front set of circuit boards 26 (e.g., by defining card guides or slots within which the set of circuit boards 26 resides). Similarly, the rear section 34 is configured to support the rear set of circuit boards 28.

With reference to FIG. 1, the chassis 30 (or alternatively the electronic equipment shelf 22) includes a set of panels 40 (e.g., doors, sides, etc.) which is shown generally by the arrow 40 but which is otherwise omitted in order to better illustrate other aspects of the electronic system 20. Nevertheless, it should be understood that such panels 40 substantially enclose the electronic equipment assembly 24 for protection of the circuit boards 26, 28 (e.g., protection against tampering, protection against inadvertent damage due to external movement adjacent the electronic equipment shelf 22, etc), for electromagnetic interference (EMI) shielding, and for formation of a serpentine airflow pathway 44 through which a robust air stream 42 flows in order to carry away heat from the circuit boards 26, 28). This aspect will be further described shortly.

As shown in FIGS. 1-3, the electronic equipment assembly 24 further includes a midplane 46 and a fan subsystem 48. The midplane 46 is physically disposed within the chassis 30 between the front and rear sections 32, 34, and is configured to directly connect with both the front set of circuit boards 26 and with the rear set of circuit boards 28. The fan subsystem 48 is also physically disposed within the chassis 30, and is configured to generate the serpentine air stream 44 which passes from the front section 32, around a top, bottom or side 50 of the midplane 46 (e.g., a top edge as shown in FIG. 1), to the rear section 34.

In the arrangement of FIGS. 1-3, the fan subsystem 48 includes multiple fan trays 52(A), 52(B) (collectively, fan trays 52). The air flow of the serpentine air stream 44, which is generated by the fan trays 52, is faster through the front section 32 past the front set of circuit boards 26 relative to the rear section 34 past the rear set of circuit boards 28. In one arrangement, the different air flow rates are achieved by making the cross-sectional area 54 through the front section 32 smaller than the cross-sectional area 56 through the rear section 34 (e.g., with reference to FIG. 1, the cross-sections 54, 56 are shown as extending along the dashed line A-A and as being co-planar with the X-Z plane). Further details of the fan subsystem 48 will now be provided with reference to FIG. 4.

Figure 4:
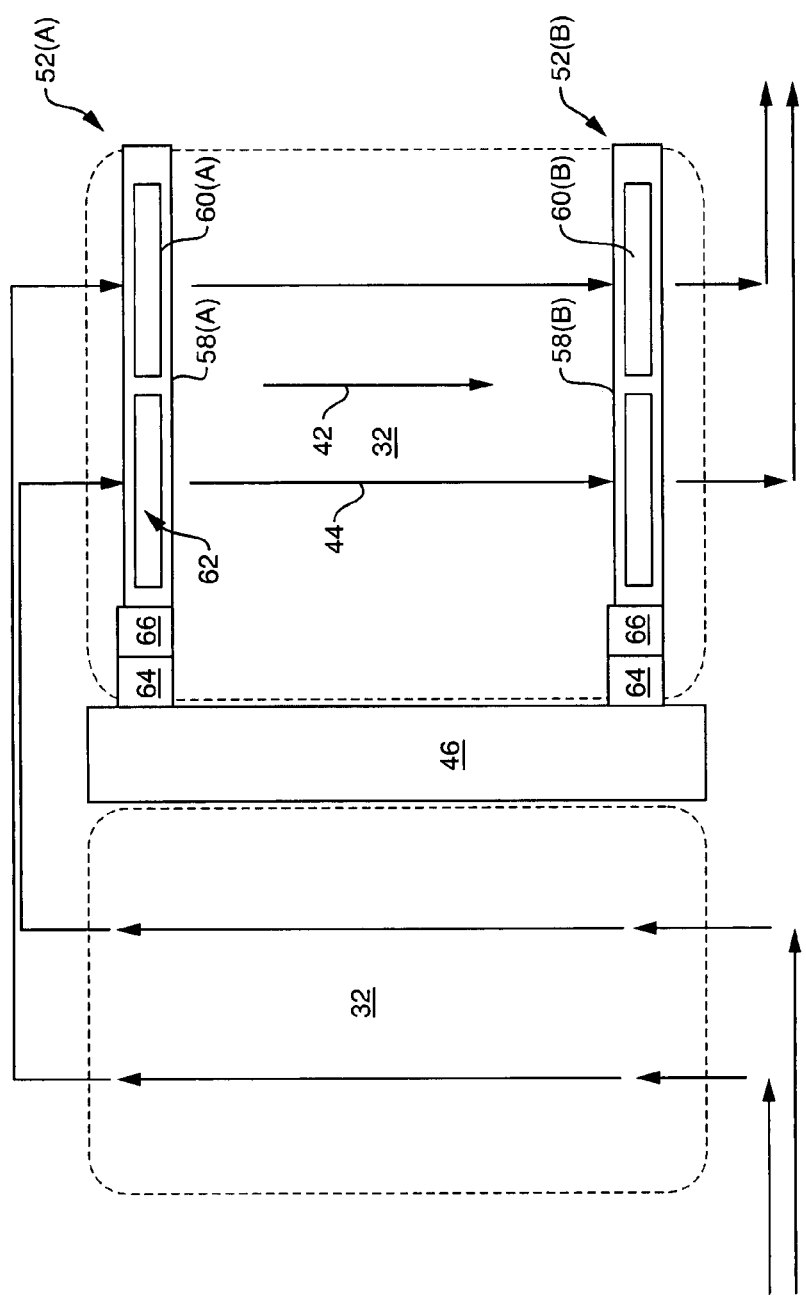
FIG. 4 is a block diagram of the electronic system of FIG. 1.

FIG. 4 is a block diagram of various components of the electronic system 20 of FIGS. 1-3. As shown in FIG. 4, the fan tray 52(A) has a frame 58(A) configured to engage with the chassis 30 (FIGS. 1-3) and a set of fans 60(A) disposed in a coplanar manner (e.g., four fans sitting 60(A) side-by-side in a 2×2 arrangement with four fans total per fan tray) within the frame 58(A) (e.g., in the X-Z plane). Similarly, the fan tray 52(B) has a frame 58(B) configured to engage with the chassis 30 (FIGS. 1-3) and a set of fans 60(B) disposed in a coplanar manner (e.g., another four fans sitting 60(B) side-by-side in a 2×2 arrangement) within the second first frame 58(B) (e.g., in the X-Z plane).

During operation, the fan tray 52(A) is configured to push air of the air stream toward the fan tray 52(B), and the fan tray 52(B) is configured to pull the air from the fan tray 52(A). Since the fan tray 52(A) sits between the front and rear sections 32, 34 along the airflow pathway 42, the fan tray 52(A) draws air from the front section 32 and propels that air into the rear section 34.

In some arrangements, the fans 60(A), 60(B) are smart fans, i.e., the fans 60(A), 60(B) include intelligence circuitry 62 which enable the fans 60(A), 60(B) to report their respective operating states to other circuitry (e.g., the circuit boards 26, 28). Such operation enables this circuitry to determine a fan failure and provide a signal requesting service (e.g., to inform a technician that there is a problem with a particular fan). In these arrangements, the midplane 46 includes midplane data ports 64 (e.g., midplane circuit board connectors) and the fans 60(A), 60(B) include respective fan data ports 66 (e.g., fan connectors) to enable the fans 60(A), 60(B) to connect directly to the midplane 46. As a result, the fan trays 52 easily plug into and unplug from the midplane 46 (e.g., in the same manner as a circuit board) thus enabling quick and convenient replacement (e.g., hot swapping) and avoiding the need to handle cumbersome and obstructing cables.

Various additional details of the electronic system 20 will now be provided with reference to all of the figures, i.e., FIGS. 1-4. In particular, it should be understood that the serpentine airflow pathway 44 in which air of the air stream 42 enters through an input duct 70 of the shelf 22 and exits through an output duct 72 of the shelf 22 (e.g., see FIG. 1). In some arrangements, the input and output ducts 70, 72 are at substantially the same height. Such operation enables ambient air to be drawn from the front 36 of the shelf 22 and exhausted at the rear 38 of the shelf 22 at substantially the same level along the Y-axis. Accordingly, additional equipment is capable of residing adjacent the electronic system 20 (e.g., above the system 20, below the system 20, to the side of the system 20, etc.) and the external air flow affects of the system 20 are largely similar to those of other standard equipment.

However, as mentioned above, the serpentine airflow pathway 44 within the system 20 winds through the chassis 30 in a serpentine manner. In particular, the airflow pathway 42 bends at substantially 90 degrees from the input duct 70 to the front section 32 (i.e., from a horizontal direction to an upward direction), bends at substantially 180 degrees from the front section 32 to the rear section 34 at a top location 74 (i.e., from the upward direction to the downward direction, see FIG. 1), and bends at substantially 90 degrees from the rear section 34 to the exhaust duct 72 (i.e., from the downward direction to a horizontal direction).

In some arrangements, the chassis 30 defines a narrow plenum 76 along the serpentine airflow pathway 44 between the front section 32 and the rear section 34. The narrow plenum 76 sits above the rear section 34 at the top location 74, and is substantially 2 inches tall by 17 inches wide by 11 inches deep. This plenum 76 participates in directing the air flow around its 180 degree turn to circumvent the midplane 46. Accordingly, the system 20 allows for relatively large height circuit boards 26, 28 but nevertheless maintains an optimal height profile (e.g., for a half height rack mount environment). Moreover, the fan subsystem 48 is capable of generating robust airflow for thoroughly maintaining the circuit boards 26, 28 within well-controlled operating temperature ranges.

In some arrangements, the fan subsystem 48 is configured to provide the air stream 44 at a nominal rate of substantially in a range of 600 to 900 linear feet per minute through the front section 32 of the chassis 30 and at a nominal rate of substantially in a range of 300 to 450 linear feet per minute through the rear section 34 of the chassis 30, i.e., substantially twice as fast through the front section 32 than the rear section 34. Such a situation is very well suited for supporting network equipment containing optical circuitry which is temperature sensitive. In a particular arrangement, the front set of circuit boards 26 includes multiple programmable line card interface modules configured to exchange optical signals with an external network, and the rear set of circuit boards 28 includes multiple line cards and multiple fabric cards configured to exchange optical signals with an internal network. Here, the optics of the programmable line card interface modules may be very expensive, and maintaining the temperature of such optics within an extremely narrow temperature range by positioning these optics in the section 32 with the faster moving airflow significantly enhances the lifetime of these optics. In particular, with such airflow, the fan subsystem 48 is capable of maintaining temperature of the front set of circuit boards 26 substantially within 5 degrees Celsius of ambient air temperature. In contrast, the fan subsystem 48 maintains the temperature of the rear set of circuit boards 28 substantially within 15 degrees Celsius of the ambient air temperature which is very sufficient line cards and fabric cards relating to an internal network.

As mentioned above, an improved electronic equipment assembly 22 utilizes a serpentine airflow pathway 42 in which air of an air stream 44 passes through a front chassis section 32 and a rear chassis section 34 by going around a midplane 46 disposed between the front and rear chassis sections 32, 34. As the air stream 44 flows through the front and rear chassis sections 32, 34, the air flows through the sections 32, 34 at different rates. Accordingly, temperature-critical circuitry can be disposed in the section 32, 34 having the faster airflow for robust heat removal. As such, there is less dependency on particular locations of air input and output ducts 70, 72 thus enabling manufacturers to place these ducts 70, 72 at convenient and desirable locations, e.g., at the same height at the front and rear of an equipment rack 22.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the air stream 44 was shown circumventing the midplane 46 over the top edge 50 by way of example only. In other arrangements, the air stream 44 flows around the midplane 46 at a different edge (e.g., underneath, around a side, etc.).

Additionally, it should be understood that the orientation of the chassis 30 was shown in FIGS. 1-4 where the air flows upwardly through the front section 32, and downwardly through the rear section 34 by way of example only. Other orientations are suitable for use as well.

Furthermore, it should be understood that the circuit boards 26, 28 were described above as being configured to perform network operations by way of example only. The electronic system 20 can include circuitry that performs other operations such as general computing operations, intensive data processing operations, data storage operations, and so on.

What is claimed is:

1. An electronic system, comprising:
a front set of circuit boards;
a rear set of circuit boards; and
an electronic equipment assembly which includes:
   a shelf having a front section configured to support the front set of circuit boards and a rear section configured to support the rear set of circuit boards,
   a midplane disposed within the shelf between the front section and the rear section, the midplane being configured to directly connect to the front set of circuit boards and to the rear set of circuit boards, and
   a fan subsystem disposed within the shelf, the fan subsystem being configured to generate an air stream through the front and rear sections with air flow of the air stream being faster through the front section past the front set of circuit boards relative to the rear section past the rear set of circuit boards;
wherein the front set of circuit boards includes multiple programmable line card interface modules configured to exchange optical signals with an external network; and wherein the rear set of circuit boards includes multiple line cards and multiple fabric cards configured to exchange optical signals with an internal network; and
wherein the fan subsystem of the electronic equipment assembly includes:
a first fan tray having a first frame configured to engage with the shelf and a first set of fans disposed in a coplanar manner within the first frame; and
a second fan tray having a second frame configured to engage with the shelf and a second set of fans disposed in a coplanar manner within the second first frame, the first fan tray being configured to push air of the air stream toward the second fan tray, and the second fan tray being configured to pull the air from the first fan tray.

2. An electronic system as in claim 1 wherein the first fan tray is configured to draw air from the front section and propel that air into the rear section; wherein the first set of fans includes two fans disposed side-by-side to each other; and wherein the second set of fans includes two other fans disposed side-by-side to each other.

3. An electronic system as in claim 2, further comprising:
front and rear card cages, wherein the shelf is configured to mount within a rack and define a serpentine airflow pathway in which air of the air stream enters through an input duct of the shelf, bends at substantially 90 degrees from the input duct to the front card cage, bends at substantially 180 degrees from the front card cage to the rear card cage, and bends at substantially 90 degrees from the rear card cage to an exhaust duct of the shelf to exit through the exhaust duct of the shelf.

4. An electronic equipment assembly, comprising:
a shelf having a front section configured to support a front set of circuit boards and a rear section configured to support a rear set of circuit boards;
a midplane disposed within the shelf between the front section and the rear section, the midplane being configured to directly connect to the front set of circuit boards and to the rear set of circuit boards; and a fan subsystem disposed within the shelf, the fan subsystem being configured to generate an air stream through the front and rear sections with air flow of the air stream being faster through the front section past the front set of circuit boards relative to the rear section past the rear set of circuit boards;

wherein the fan subsystem includes:

a first fan tray having a first frame configured to engage with the shelf and a first set of fans disposed in a coplanar manner within the first frame; and a second fan tray having a second frame configured to engage with the shelf and a second set of fans disposed in a coplanar manner within the second first frame, the first fan tray being configured to push air of the air stream toward the second fan tray, and the second fan tray being configured to pull the air from the first fan tray.

5. An electronic equipment assembly as in claim 4 wherein the first fan tray is configured to draw air from the front section and propel that air into the rear section.

6. An electronic equipment assembly as in claim 5 wherein the first set of fans includes two fans disposed side-by-side to each other; and wherein the second set of fans includes two other fans disposed side-by-side to each other.

7. An electronic equipment assembly as in claim 4 wherein the midplane is further configured to directly connect to (i) the first set of fans of the first fan tray and (ii) the second set of fans of the second fan tray.

8. An electronic equipment assembly as in claim 7 wherein each fan of the first set of fans and the second set of fans has a fan data port which electrically connects to a corresponding midplane data port to exchange data between that fan and an electronic controller.

9. An electronic equipment assembly, comprising:

a shelf having a front section configured to support a front set of circuit boards and a rear section configured to support a rear set of circuit boards;

a midplane disposed within the shelf between the front section and the rear section, the midplane being configured to directly connect to the front set of circuit boards and to the rear set of circuit boards; and a fan subsystem disposed within the shelf, the fan subsystem being configured to generate an air stream through the front and rear sections with air flow of the air stream being faster through the front section past the front set of circuit boards relative to the rear section past the rear set of circuit boards;

wherein the shelf is configured to mount within a rack and define, in combination with the rack, a serpentine airflow pathway in which air of the air stream enters through an input duct of the rack, bends at substantially 90 degrees from the input duct to the front section, bends at substantially 180 degrees from the front section to the rear section, and bends at substantially 90 degrees from the rear section to an exhaust duct of the rack to exit through the exhaust duct of the rack.

10. An electronic equipment assembly as in claim 9 wherein the shelf defines a plenum along the serpentine airflow pathway between the front section and the rear section, the plenum being substantially 2 inches tall by 17 inches wide by 11 inches deep.

11. An electronic equipment assembly as in claim 10 wherein the shelf is configured to install within the rack with the plenum defined by the shelf being disposed adjacent a top portion of the rack and distal to a bottom portion of the rack.

12. An electronic equipment assembly as in claim 9 wherein the fan subsystem is configured to provide the air stream at a nominal rate of substantially in a range of 600 to 900 linear feet per minute through the front section of the shelf and at a nominal rate of substantially in a range of 300 to 450 linear feet per minute through the rear section of the shelf.

13. An electronic equipment assembly as in claim 12 wherein the fan subsystem is configured to (i) maintain temperature of the front set of circuit boards substantially within 5 degrees Celsius of ambient air temperature; and (ii) maintain temperature of the rear set of circuit boards substantially within 15 degrees Celsius of the ambient air temperature.

14. An electronic equipment assembly, comprising:

a shelf having a front section configured to support a front set of circuit boards and a rear section configured to support a rear set of circuit boards;

a midplane disposed within the shelf between the front section and the rear section, the midplane being configured to directly connect to the front set of circuit boards and to the rear set of circuit boards; and means for generating an air stream through the front and rear sections with air flow of the air stream being faster through the front section past the front set of circuit boards relative to the rear section past the rear set of circuit boards;

wherein the means for generating the air stream includes:

a first fan tray having a first set of fans disposed in a coplanar manner and means for holding the first set of fans to the shelf; and a second fan tray having a second set of fans disposed in a coplanar manner and means for holding the first set of fans to the shelf, the first fan tray being configured to push air of the air stream toward the second fan tray, and the second fan tray being configured to pull the air from the first fan tray.

15. An electronic equipment assembly as in claim 14 wherein the midplane is further configured to directly connect to (i) the first set of fans of the first fan tray and (ii) the second set of fans of the second fan tray; and wherein each fan of the first set of fans and the second set of fans has a fan data port which electrically connects to a corresponding midplane data.

16. An electronic equipment assembly as in claim 15 wherein the shelf includes:

means for mounting to a rack; and means for defining, in combination with the rack, a serpentine airflow pathway in which air of the air stream enters through an input duct of the rack, bends at substantially 90 degrees from the input duct to the front section, bends at substantially 180 degrees from the front section to the rear section, and bends at substantially 90 degrees from the rear section to an exhaust duct of the rack to exit through the exhaust duct of the rack.

17. An electronic system, comprising:

a front set of circuit boards;

a rear set of circuit boards; and an electronic equipment assembly which includes:

a shelf having a front section configured to support the front set of circuit boards and a rear section configured to support the rear set of circuit boards, a midplane disposed within the shelf between the front section and the rear section, the midplane being configured to directly connect to the front set of circuit boards and to the rear set of circuit boards, and a fan subsystem disposed within the shelf, the fan subsystem being configured to generate an air stream through the front and rear sections with air flow of the air stream being faster through one of the front and rear sections and slower through the other of the front and rear sections;

wherein the fan subsystem of the electronic equipment assembly includes:

a first fan tray having a first frame configured to engage with the shelf and a first set of fans disposed in a coplanar manner within the first frame, and a second fan tray having a second frame configured to engage with the shelf and a second set of fans disposed in a coplanar manner within the second first frame, the first fan tray being configured to push air of the air stream toward the second fan tray, and the second fan tray being configured to pull the air from the first fan tray.

\* \* \* \* \*